April 18, 1933.   A. FERRANDO ET AL   1,904,430
METHOD OF MAKING VALVES FOR EXPLOSION ENGINES
Filed March 2, 1929

Patented Apr. 18, 1933

1,904,430

UNITED STATES PATENT OFFICE

AMEDEO FERRANDO AND ALBINO ZANZI, OF IVREA, ITALY, ASSIGNORS TO DITTA GIOVANNI ZANZI, OF IVREA, ITALY

METHOD OF MAKING VALVES FOR EXPLOSION ENGINES

Application filed March 2, 1929, Serial No. 343,929, and in Italy April 4, 1928.

The valves for explosion engines presently in use are made in one piece of high-grade material as would be strictly necessary only for the valve head, this material being generally steel containing a high percentage of nickel or nickel-chrome, which is very hard, requires time and power for the mechanical treatment which meets with considerable difficulties at high temperatures as required by upsetting and pressing, as the material easily loses its properties if the temperature exceeds certain narrow limits necessary for obtaining good forging results.

Attempts have been made to reduce the high cost of valves entailed by the use of the high-grade material for the whole valve and by the expenditure of time and money in manufacturing the valves by upsetting on special electric machines from a high-grade steel bar, which is heated through the Joule's effect and jolted so as to form an enlargement out of which the valve head is pressed. By this method the metal often burns owing to the excessive local heat in the most dangerous point for the breakage of the valve, i. e. in the connection between head and stem. The consequence is a great deal of waste without any guarantee that the metal has not lost its properties owing to the excessive, or sometimes unsufficient heating during upsetting, as it is practically impossible to effect a reliable control of the working temperature.

By the use of this invention the above mentioned drawbacks are obviated and valves are obtained which are cheaper, stronger, and more reliable than those produced heretofore, although the head only is made of the same high-grade material as these latter.

The chief feature of this invention is that the valve head is made of a material other than that constituting the stem. We make the valve head of a high-grade material and employ for the stem a less expensive, hard and strong material, as sufficient for the work of the stem, which is limited exclusively to sliding in the guide member.

Another object of the invention is to force and enlarge the stem end into the head, which ensures a perfect connection of the two materials by hot pressing.

According to our process the perfectly polished end of the bar adapted to form the stem is introduced into a blind bottom cylindrical recess of corresponding size, formed on a small high-grade steel cylinder adapted to form the valve head.

The bar end which has been forced into the cylinder is then heated until this latter reaches a suitable temperature, generally equal to the temperature being the lower limit for a good forging of the material of which the cylinder is made. The parts thus attached together are then brought under a press and the finished head of the desired form is obtained by a single pressing operation, after which the valve has just to be finished, i. e. the seat and stem are ground and a slot is cut at the stem end for fitting in the cotter.

As stem metal we use e. g. a drawn steel bar with a small percentage of nickel, while we employ as head metal a steel bar containing a high percentage of nickel or nickel-chrome and having a larger diameter, which we cut into cylinders of the desired length, into a blind bottom recess whereof we force the stem end.

During hot pressing the fibres of the cylinder metal extend and come parallel to the outer surfaces of the valve head in the portion of this latter which undergoes the higher stresses and the stem end fitted into the cylinder is enlarged and follows the deformations of this latter so that the connection of the two metals in the joint is absolutely continuous.

It is advisable to employ as stem material a metal having a coefficient of expansion not lower than that of head material.

By varying the cylinder size it is possible to obtain different forms of joints between head and stem, according to requirements, form and use of the valve to be manufactured.

The accompanying drawing shows by way of example, some constructional forms of the object of this invention.

Figure 1:
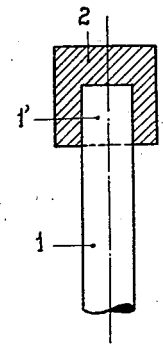
Figures 1 and 2 show the two parts adapted to form the valve head and stem, respectively, before and after pressing.
Figure 2:
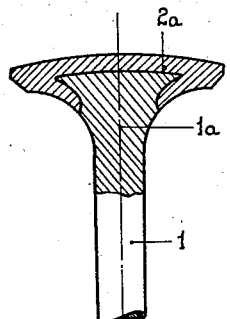
Figure 4:
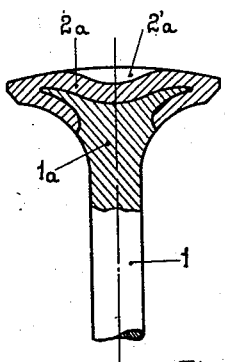
Figure 6:
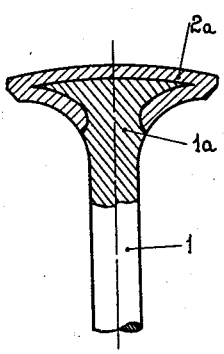

The valve heads shown in Figures 2, 4 and 6 are pressed in their ultimate form, after which only grinding of the seat surface is required.

1 denotes the rod adapted to form the valve stem and the end 1' of which is fitted into a recess of the same size on the high-grade steel cylinder 2.

The cylinder 2 is conveniently cut from a bar of suitable diameter.

By hot pressing the parts take the form shown in sectional view in Figure 2; the cylinder 2 becomes the head 2a and the stem end 1' becomes the enlargement 1a clamped in the valve head. The connecting surface between the two parts ends almost perpendicularly to the joint between head and stem and there is no discontinuity in this point as a sort of welding has taken place between both materials.

Figure 3:
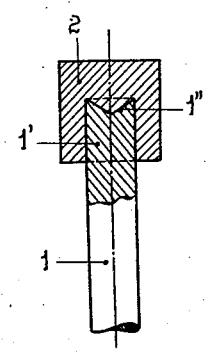
Figures 3 and 4 are similar views of a modified construction.

According to the modified construction shown in Figures 3 and 4, in order to obtain on the upper valve surface a recess 2'a, we make the bottom of the recess on the cylinder 2 (Fig. 3) of a conical form corresponding to that of a recess 1" on the end 1' of the stem 1.

Figure 5:
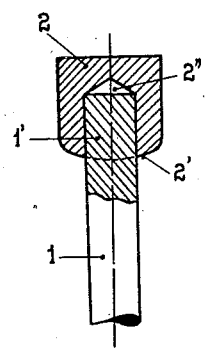
Figures 5 and 6 show a further modified form.

According to the modified construction shown in Figures 5 and 6, the cylinder 2 is provided with a rounded bottom 2', while the blind bottom on which the valve stem 1 is fitted ends by a conical recessed portion 2".

In this case the pressing operation takes place under particularly favourable conditions and the cylinder metal is upset downwards and spreads on a larger zone reinforcing the valve structure.

By varying the form of the cylinder 2 and its initial joint with the stem it is possible to obtain after pressing an ultimate joint of any desired form.

Our process can be usefully employed also in the manufacture of other articles, as valve tappets for engines, of which one portion only is submitted to considerable stresses during working, the use of the high-grade expensive metal being limited to this portion.

What we claim is:

A process for manufacturing valves more particularly for internal combustion engines, consisting in forming in a cylinder of high grade metal serving to form the valve head an axial bore having on its bottom a conical projection, in fitting in said bore a cylindrical stem of lower grade metal having in its end surface a conical cavity corresponding to the conical projection of the bottom of the cylinder bore, in heating said cylinder and said stem and upsetting simultaneously said cylinder and the end of said stem to expand the stem material radially in the form of a flange of substantial thickness enclosed in a casing of uniform thickness constituting the valve head.

In testimony that we claim the foregoing as our invention, we have signed our names.

AMEDEO FERRANDO.
ALBINO ZANZI.